Patented May 20, 1930

1,759,658

UNITED STATES PATENT OFFICE

ALWIN MITTASCH, OF LUDWIGSHAFEN-ON-THE-RHINE, CARL MÜLLER, OF MANNHEIM, AND EDUARD LINCKH, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF PURE IRON

No Drawing. Application filed December 21, 1925, Serial No. 76,871, and in Germany December 15, 1924.

We have found that very pure iron can be advantageously prepared by bringing iron carbonyl into contact with heated bodies at a temperature of about 100 degrees centigrade or more. The heated bodies are preferably melts for example molten iron or other metals. The decomposition may be carried out with iron carbonyl in a liquid or gaseous condition. Preferably the process is carried out by passing iron carbonyl vapors in a dilute condition through the liquid or melt and in this case the dilution of the iron carbonyl vapors may be effected either by reducing the pressure or by admixing inert or reducing gases. The speed at which the iron carbonyl is brought into contact with the heated bodies should be so chosen that no unaltered iron carbonyl escapes with the carbon monoxide formed. By this method it is possible to decompose the iron carbonyl according to the equation $Fe(CO)_5 = Fe + 5CO$, so as to obtain the iron completely or substantially free of carbon and to recover practically completely the carbon monoxid which is contained in the iron carbonyl in a combined state. Our invention permits the preparation of pure iron from impure iron or from iron ores of little value, using iron carbonyl as an intermediate product. For example, pure iron can be produced with the aid of this method from iron carbonyl obtained from iron turnings or filings according to the equation $Fe + 5CO = Fe(CO)_5$ by the action of carbon monoxid at an elevated temperature and preferably under elevated pressure, also from iron ores containing copper and zinc which can be worked up only with difficulty in blast furnaces which ores, however, after being roasted and reduced can be conveniently worked up in the manner mentioned above.

In order to carry out the process, iron carbonyl formed by passing carbon monoxid or gases containing carbon monoxid over iron, is preferably not condensed to a liquid, but the gaseous mixture containing it is directly or after further dilution subjected to decomposition in heated liquids or melts. The process can be carried out in various manners; depending on the conditions of working, the iron is obtained for example as an extremely fine powder or as a molten mass.

The following example will further illustrate the nature of our invention which, however, is not limited to this example.

Example

Iron is fused in a closed crucible furnace heated by an electric arc, and a mixture of iron carbonyl vapor and carbon monoxid or carbon monoxid and nitrogen is forced through the melt from below. The iron carbonyl is at once decomposed and the iron formed taken up by the melt, the increase of which may be withdrawn continuously or periodically. The liberated gas consisting chiefly of carbon monoxid alone or mixed with nitrogen is led away through a pipe at the top of the crucible and is utilized for a new production of iron carbonyl or for other purposes. For the preparation of the iron melt when starting the process, iron obtained from iron carbonyl in a previous operation is advantageously used in order to exclude impurities as far as possible.

We claim:

1. The process of manufacturing pure iron which comprises subjecting iron carbonyl vapor in a diluted condition to thermal decomposition by contact with a molten metal.

2. The process of manufacturing pure iron which comprises passing iron carbonyl vapor in a diluted condition through molten iron.

3. The process of manufacturing pure iron which comprises subjecting a gaseous mixture containing iron carbonyl vapor as obtained by the reaction of carbon monoxid on metallic iron, without separating the iron carbonyl therefrom, to thermal decomposition by passing it through molten iron.

4. The process of manufacturing pure iron which comprises bringing iron carbonyl in contact with a molten metal.

5. The process of manufacturing pure iron which comprises bringing iron carbonyl in contact with molten iron.

In testimony whereof we have hereunto set our hands.

ALWIN MITTASCH.
CARL MÜLLER.
EDUARD LINCKH.